United States Patent
Hsieh et al.

(10) Patent No.: US 6,819,321 B1
(45) Date of Patent: Nov. 16, 2004

(54) METHOD AND APPARATUS FOR PROCESSING 2D OPERATIONS IN A TILED GRAPHICS ARCHITECTURE

(75) Inventors: Hsien-Cheng Hsieh, Gold River, CA (US); Vladimir M. Pentkovski, Folsom, CA (US); Hsin-Chu Tsai, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/540,615

(22) Filed: Mar. 31, 2000

(51) Int. Cl.[7] .............................................. G06F 1/20
(52) U.S. Cl. .................... 345/506; 345/419; 345/501; 345/503
(58) Field of Search ................................ 345/501, 502, 345/503, 504, 505, 506, 418, 419; 34/522

(56) References Cited

U.S. PATENT DOCUMENTS

| | | | | |
|---|---|---|---|---|
| 4,953,101 A | * | 8/1990 | Kelleher et al. | 345/505 |
| 6,031,550 A | * | 2/2000 | Larson | 345/562 |
| 6,078,338 A | * | 6/2000 | Horan et al. | 345/521 |
| 6,084,599 A | * | 7/2000 | Nakatsuka et al. | 345/501 |
| 6,094,203 A | * | 7/2000 | Desormeaux | 345/501 |
| 6,229,553 B1 | * | 5/2001 | Duluk, Jr. et al. | 345/506 |
| 6,268,875 B1 | * | 7/2001 | Duluk, Jr. et al. | 345/506 |
| 6,344,852 B1 | * | 2/2002 | Zhu et al. | 345/418 |
| 6,377,266 B1 | * | 4/2002 | Baldwin | 345/506 |
| 6,552,723 B1 | * | 4/2003 | Duluk et al. | 345/419 |
| 6,608,625 B1 | * | 8/2003 | Chin et al. | 345/501 |

* cited by examiner

*Primary Examiner*—Matthew C. Bella
*Assistant Examiner*—Mackly Monestime
(74) *Attorney, Agent, or Firm*—Blakely, Sokoloff, Taylor & Zafman LLP

(57) ABSTRACT

A method for processing 2D operations in a tiled graphics architecture is disclosed. A graphics controller processes both 3D primitives and 2D blit operations. The 3D primitives are sorted into bins using well-known techniques. When a 2D blit operation is to be processed, the 2D blit operation is also sorted into bins. The sorted 3D primitives and sorted 2D blit operations are then delivered to blit and rendering engines on a bin-by-bin basis. By sorting the 2D blit operations into bins along with the 3D primitives, there is no need to flush the bins (send primitives to rendering engines) whenever a 2D blit operation requires processing. The sorting of 2D blit operations into bins reduces the frequency of graphics cache misses and improves graphics memory bandwidth utilization, thereby improving overall computer system performance.

20 Claims, 7 Drawing Sheets

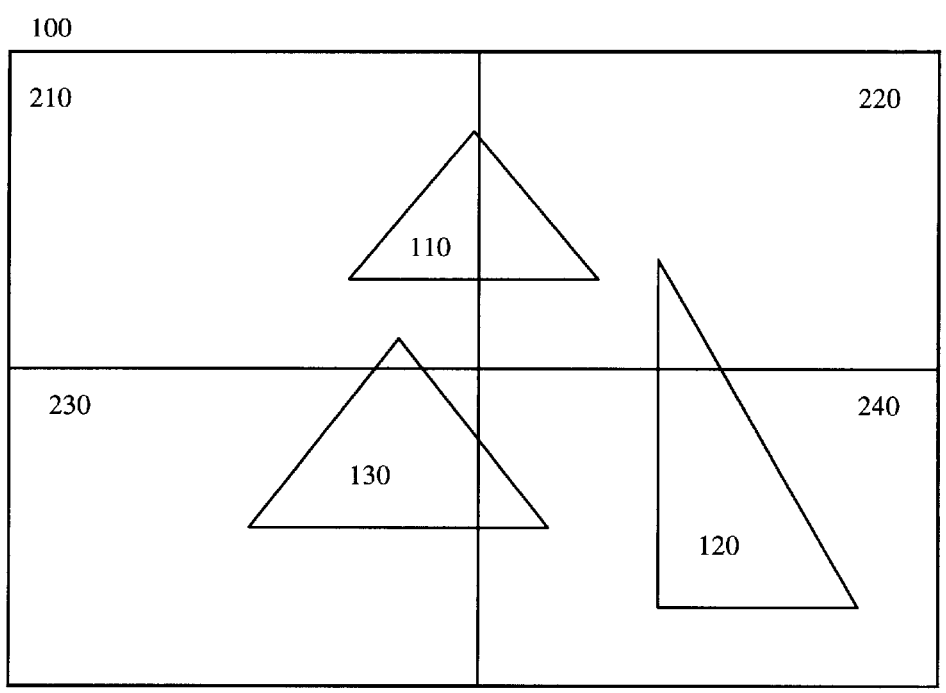
Figure 1 – Prior Art

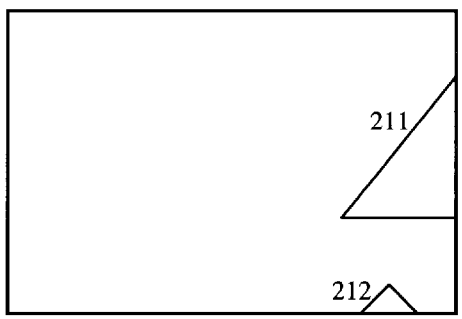
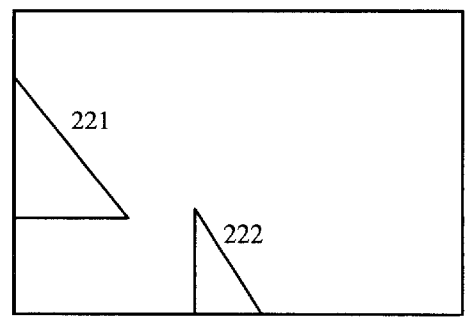
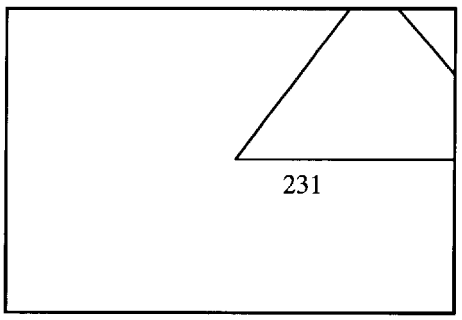
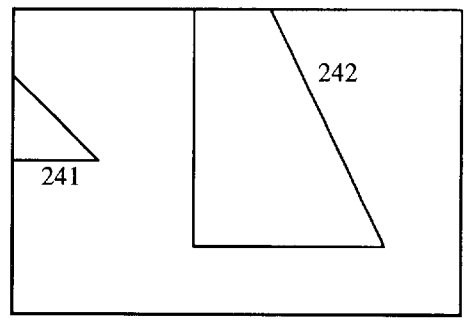
Figure 2 – Prior Art

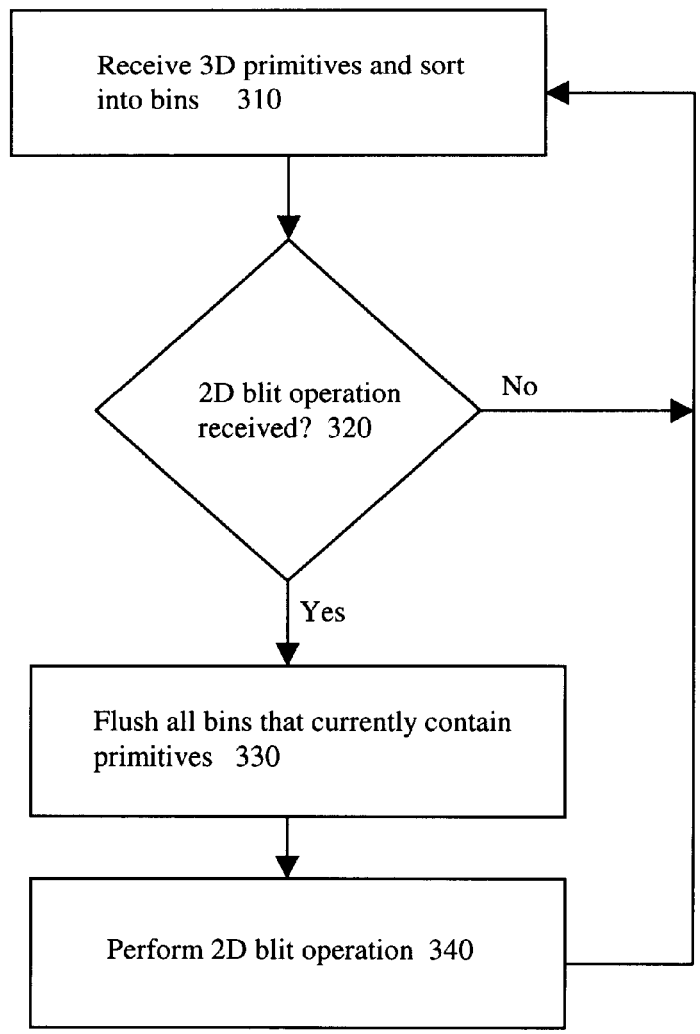
Figure 3 – Prior Art

METHOD AND APPARATUS FOR PROCESSING 2D OPERATIONS IN A TILED GRAPHICS ARCHITECTURE

FIELD OF THE INVENTION

The present invention pertains to the field of computer systems. More particularly, this invention pertains to the field of processing 2D graphics operations in graphics systems that utilize a tiled architecture.

BACKGROUND OF THE INVENTION

Computer graphics systems are commonly used for displaying graphical representations of objects on a two-dimensional video display screen. Current computer graphics systems provide highly detailed representations and are used in a variety of applications.

In typical computer graphics systems, a three dimensional (3D) object to be represented on the display screen is broken down into graphics primitives. Typically, the primitives of a 3D object to be rendered are defined by a host computer in terms of primitive data. For example, when the primitive is a triangle, the host computer may define the primitive in terms of the X, Y and Z coordinates of its vertices, as well as the red, green and blue (R, G and B) color values of each vertex. Additional primitive data may be used in specific applications. Rendering hardware interpolates the primitive data to compute the display screen pixels that represent each primitive, and the R, G and B color values for each pixel.

Typical computer graphics systems further include a graphics cache memory. In order to make more efficient use of the graphics cache memory, 3D primitives are sorted into bins. This well-know technique is often referred to as "tiling".

FIG. 1 and FIG. 2 show an example of sorting 3D primitives into bins, or "tiling". For this example, a graphics controller receives data for primitives 110, 120, and 130. The primitives 110, 120, and 130 are to be rendered and then displayed on a display screen 100. When rendering a 3D primitive, the graphics controller reads an appropriate portion of display data from the graphics memory into the graphics cache memory. The graphics controller then renders the primitive and combines the rendered primitive with the display data stored in the graphics cache memory. The graphics memory may be located within main system memory.

In a non-tiled graphics architecture, if the graphics controller were to render primitive 110, then primitive 120, and then primitive 130, every time the graphics controller moved from one primitive to the next a new portion of display data would need to be retrieved from the graphics memory, resulting in many graphics cache misses and a greater utilization of graphics memory bandwidth.

In order to improve graphics memory bandwidth utilization, a tiling function is performed on the primitives 110, 120, and 130. The primitives 110, 120, and 130 of this example are sorted into bins 210, 220, 230, and 240, as shown in FIG. 2. The sorting technique generally involves a microprocessor analyzing which bins the various primitives intersect and then writing copies of the primitive data to the storage areas within main memory for the bins which the primitives intersect. The graphics controller then reads the primitive data out of the bin storage area and then divides the primitives to create the smaller primitives that fit into the various tiles. For example, primitive 110 is divided to create primitive 211 located in bin 210 and primitive 221 located within bin 220. Primitive 120 is divided to create primitive 222 located in bin 220 and primitive 242 located in bin 240. Primitive 130 is divided to create primitive 212 located in bin 210, primitive 231 located in bin 230, and primitive 241 located within bin 240.

Once the primitives are divided into the smaller primitives for a given bin, the bin can rendered. Typically, the graphics controller processed the bins one at a time. Because the appropriate display data for the each of the primitives located within a particular bin is stored in the same area of the graphics memory, fewer cache misses will result when rendering the primitives, resulting in an improvement in graphics memory bandwidth utilization.

However, it is also common in a typical graphics system for two-dimensional (2D) operations to be mixed in with 3D operations. For example, a microprocessor may receive primitive data for several 3D objects, then receive a command to perform a 2D blit operation, then receive more 3D primitive data.

FIG. 3 is a flow diagram describing how typical prior graphics systems handle 2D operations in a tiled architecture. At step 310, a processor receives 3D primitive data and sorts the primitives into bins. If a 2D blit operation is received at step 320, all of the bins that contain primitive data are flushed (sent to a graphics controller to be rendered). Then, at step 340, the 2D blit operation is performed. Following the 2D blit operation, the processor can then begin to sort additional 3D primitives into bins.

The flushing and rendering of the bins whenever a 2D operation is received may destroy, in large part, the benefits of tiling the 3D primitives due to an increase in graphics cache misses. The result is a greater utilization of graphics memory bandwidth. This resulting increase in graphics memory bandwidth utilization may be especially problematic in computer systems where a portion of system main memory is used as a graphics memory and many system agents desire access to the system main memory. An increase in main memory bandwidth utilization by the graphics controller may have a negative impact on overall system performance.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 1 is a diagram of a several 3D objects arranged on a display screen in accordance with prior systems.

FIG. 2 is a diagram depicting the several 3D objects of FIG. 1 sorted into bins in accordance with prior systems.

FIG. 3 is a flow diagram of a prior method for handling 2D operations in a tiled graphics architecture.

DETAILED DESCRIPTION

An example embodiment of a method for processing 2D operations in a tiled graphics architecture will be described. For this example, both 3D primitives and 2D blit operations are to be processed. The 3D primitives are sorted into bins using well-known techniques. When a 2D blit operation is to be processed, the 2D blit operation is also sorted into bins. The sorted 3D primitives and sorted 2D blit operations are then delivered to drawing and rendering engines on a bin-by-bin basis. By sorting the 2D blit operations into bins along with the 3D primitives, there is no need to flush the bins (send primitives to rendering engines) whenever a 2D blit operation requires processing. The sorting of 2D blit operations into bins reduces the frequency of graphics cache misses and improves graphics memory bandwidth utilization, thereby improving overall computer system performance.

The example embodiments described herein refer to 2D blit operations. The term "2D blit operation" is meant to include any operation that instructs that a two-dimensional object be drawn on a display screen. 2D blit operations may also be used to initialize color or Z (depth) buffers in a graphics system. Further, although the example embodiments described herein discuss a small number of 3D and 2D operations and primitives, the embodiments are meant to handle very large numbers of 3D and 2D operations and primitives.

Figure 4:
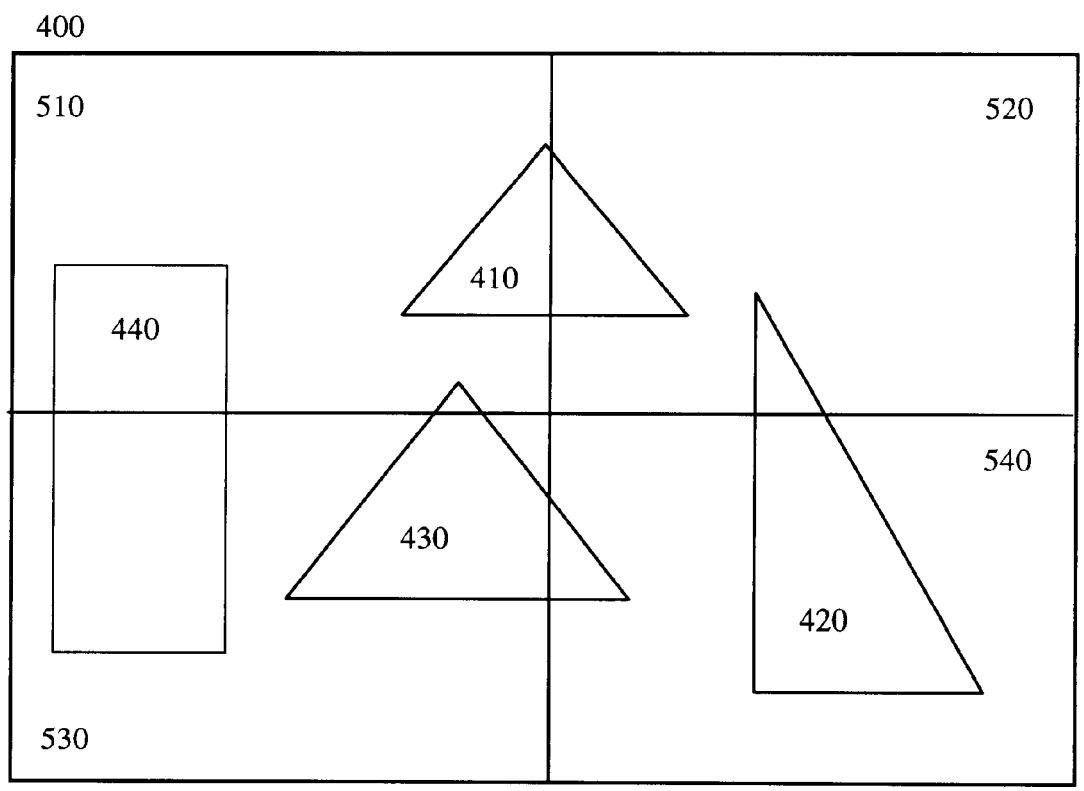
FIG. 4 depicts several 3D objects and a 2D object arranged on a display screen.

FIG. 4 is a representation of several 3D primitives and a 2D object to be drawn on a display screen 400. For this example, 3D primitives 410, 420, and 430 as well as a 2D blit operation for 2D object 440 are received by a microprocessor. The microprocessor sorts the 3D primitives 410, 420, and 430 into one or more of bins 510, 520, 530, and 540. Although this example describes the screen display area as divided into four bins in order to more clearly describe the invention, other embodiments are possible with the screen display area divided into any of a wide range of numbers of bins. Typically, the number of bins would greatly exceed four.

As shown in FIG. 4, the 3D primitive 410 falls partially within bin 510 and partially within bin 520. 3D primitive 420 falls partially within bin 520 and partially within bin 540. 3D primitive 430 falls partially within bin 510, partially within bin 530, and partially within bin 540. 2D object 440 falls partially within bin 510 and partially within bin 530.

Figure 5:
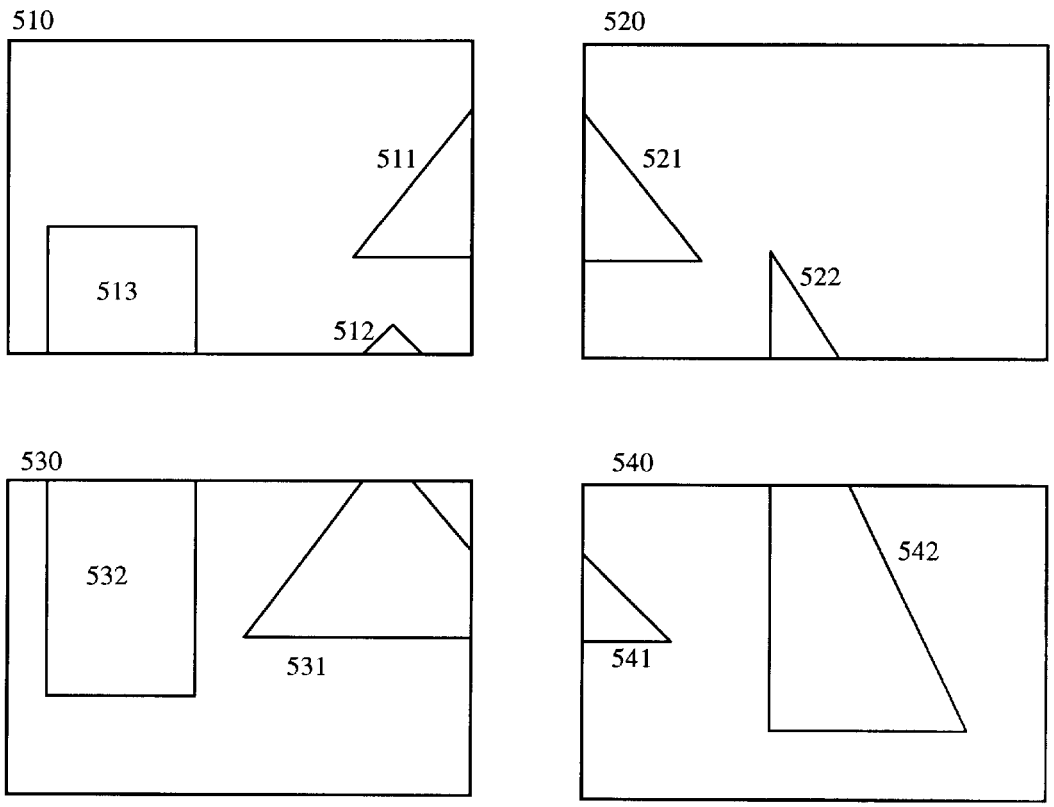
FIG. 5 is a diagram showing the several 3D objects and the 2D object from FIG. 4 sorted into bins in accordance with an embodiment of the invention.

FIG. 5 shows the 3D primitives 410, 420, and 430 as well as 2D object 440 divided into bins 510, 520, 530, and 540. A processor delivers copies of the various primitives to the graphics memory storage areas for whatever bins the primitives intersect. For example, the processor would deliver copies of the primitive data for primitive 410 to the graphics memory storage areas for bins 510 and 520. As another example, the processor delivers copies of the data for the 2D object 440 to the graphics storage areas for bins 510 and 530. By sorting the 2D object 440 into bins along with the 3D primitives, there is no need to flush the bins (send primitives to rendering engines within a graphics controller) when the blit operation for the 2D object 440 is received by the processor. The sorting of the 2D object 440 into bins reduces the frequency of graphics cache misses and improves graphics memory bandwidth utilization, thereby improving overall computer system performance.

Once the 3D primitives and the 2D object 440 are sorted into bins, a graphics controller reads the data for each bin on a bin-by-bin basis and divides the larger primitives into smaller primitives that fit within each tile. For example, the 3D primitive 410 is divided by the graphics controller to create primitive 511 within bin 510 and primitive 521 within bin 520. The 3D primitive 420 is divided by the graphics controller to create primitive 522 within bin 520 and primitive 542 within bin 540. The 3D primitive 430 is divided by the graphics controller to create primitive 512 within bin 510, primitive 531 within bin 530, and primitive 541 within bin 540. The 2D object 440 is divided by the graphics controller to create object 513 within bin 510 and object 532 within bin 530. The divided 3D primitives and divided 2D object are then delivered to drawing and rendering engines on a bin-by-bin basis.

Figure 6:
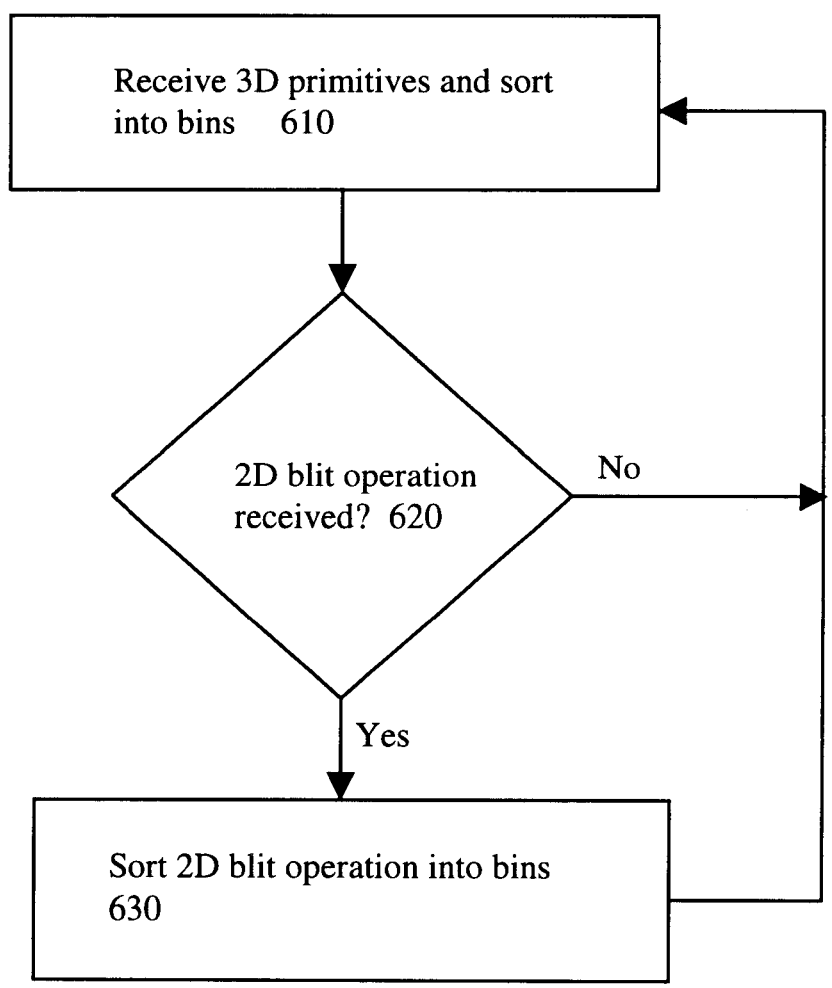
FIG. 6 is a flow diagram of one embodiment of a method for sorting 2D operations into bins.

FIG. 6 is a flow diagram of one example embodiment of a method for processing 2D blit operations in a tiled graphics architecture. At step 610, 3D primitives are received and sorted into bins. The 3D primitives in this example are delivered to a processor and the processor performs the sorting (binning) process. Other embodiments are possible where the sorting process is performed within a graphics controller.

At step 620, a determination is made as to whether a 2D blit operation is received. If there is no 2D blit operation, the process returns to step 610 and additional 3D primitives may be received. If, however, a 2D blit operation is received at step 620, the 2D operation is also sorted into bins at step 630.

Figure 7:
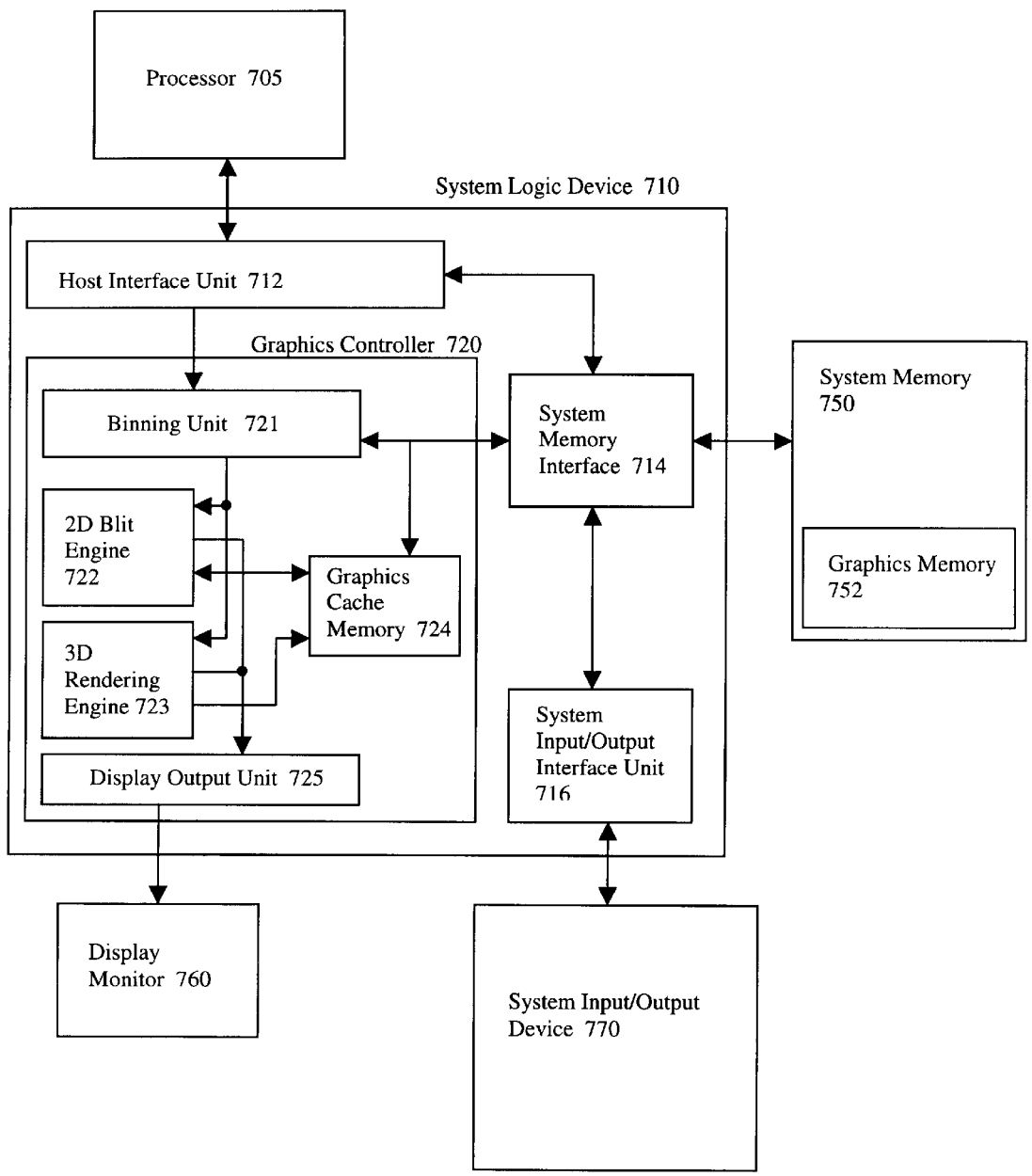
FIG. 7 is a block diagram of a system including a system logic device that incorporates a graphics controller implemented in accordance with an embodiment of the invention.

FIG. 7 is a block diagram of a system including a graphics controller 720 located in a system logic device 710. The graphics controller 720 includes a binning unit 721, a 2D blit engine 722, a 3D rendering engine 723, a display output unit 725, and a graphics cache memory 724. The 2D blit engine 722 is meant to represent a broad range of circuits utilized to perform 2D blit operations. The 3D rendering engine 723 is meant to represent a broad range of circuits utilized to process 3D primitives. Similarly, the display output unit 725 is meant to represent a broad range of circuits utilized to convert graphics display data into a form suitable for delivery to a display monitor. The display output unit 725 is connected to a display monitor 760.

In addition to the graphics controller 720, the system logic device 710 includes a host interface unit 712, a system memory interface 714, and a system input/output interface unit 716. The host interface unit 712 serves to couple various units within the system logic unit 710, including the binning unit 721 and the system memory interface 714, with a processor 705. The system memory interface 714 provides communication between the system logic device 710 and a system memory 750. The system memory 750 may include a graphics memory space 752. The system input/output interface unit 716 couples the system logic device 710 to a system input/output device 770. The system input/output device 770 is meant to include a broad range of input/output devices, including hard disk controllers, keyboard controllers, etc.

Among its activities, the processor 705 may receive a stream of graphics commands and primitives. The graphics commands and primitives may include 3D primitives and 2D blit operations. The processor 705 sorts the 3D primitives and 2D blit operations into a number of bins, as discussed above in connection with FIGS. 4 through 6. As part of the binning process, the processor 705 writes copies of 3D primitive and 2D object data to bin storage areas within the graphics memory 752.

The graphics controller 720 reads 3D primitive data and 2D object data from the graphics memory 752 on a bin-by-bin basis. The bin data is stored in the graphics cache memory 724. The graphics cache memory 724 is preferably large enough to store at least enough display data to be able to process one bin. The graphics cache memory 724 accesses the graphics memory 752 via the system memory interface 714. The data for each bin is delivered to the binning unit 721. The binning unit 721 divides the 3D primitives and 2D objects into smaller primitives and objects that fit within whichever bin the graphics controller 720 is currently processing, as discussed above in connection with FIGS. 4 through 6.

The binning unit then delivers the divided 3D primitives and 2D blit operations to either the 2D blit engine 722 or the 3D rendering engine 723. Both the 2D blit engine and the 3D rendering engine are coupled to the graphics cache memory 724. This configuration allows the 2D blit engine 722 access to intermediate rendering results stored by the 3D rendering engine 723 in the graphics cache memory 724. Another embodiment is possible where there is no connection between the graphics cache memory 724 and the 2D blit engine. However, without the connection between the 2D blit engine 722 and the graphics cache memory 724, it would be necessary to write data from the graphics cache memory 724 to the graphics memory 752 every time the 2D blit engine 722 needed to modify the display data. The 3D rendering engine 723 would then need to cause the data to be read back into the graphics cache memory 724 from the graphics memory 752 in order to continue to render 3D primitives.

In this example embodiment, the system memory 750 includes the graphics memory space 752. Other embodiments are possible that utilize a separate graphics memory. Additional embodiments are also possible where the graphics controller performs the binning operations. Still more embodiments are possible where the graphics controller 720 is not integrated into a system logic device but is contained in a discrete device and coupled to the processor via a system logic device.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. An apparatus comprising a binning unit to sort at least one 3D primitive and at least one 2D blit operation into a plurality of bins.

2. The apparatus of claim 1, further comprising a 2D pipeline coupled to the binning unit, the binning unit to communicate a plurality of tiled 2D blit operations corresponding to the 2D blit operation to the 2D pipeline, the 2D pipeline to perform the plurality of tiled 2D blit operations.

3. The apparatus of claim 2, further comprising a 3D pipeline coupled to the binning unit, the binning unit to communicate a plurality of tiled 3D primitive rendering operations corresponding to the 3D primitive to the 3D pipeline, the 3D pipeline to perform the plurality of tiled 3D primitive rendering operations.

4. The apparatus of claim 3, further comprising a graphics cache memory to store intermediate 3D rendering and 2D blit results, the graphics cache memory coupled to the 2D pipeline and further coupled to the 3D pipeline.

5. The apparatus of claim 4, wherein the graphics cache memory shares the same die with a microprocessor cache memory.

6. The apparatus of claim 4 wherein the binning unit is a microprocessor.

7. A system, comprising:
a microprocessor;
a system memory; and
a system logic unit coupled between the microprocessor and the system memory, the system logic unit including
a memory controller to provide access to the system memory, and
a graphics controller including a binning unit, the binning unit to sort at least one 3D primitive and at least one 2D blit operation into a plurality of bins.

8. The system of claim 7, wherein the graphics controller further includes a 2D pipeline coupled to the binning unit, the binning unit to communicate a plurality of tiled blit operations corresponding to the 2D blit operation to the 2D pipeline, the 2D pipeline to perform the plurality of tiled blit operations.

9. The system of claim 8, wherein the graphics controller further includes a 3D pipeline coupled to the binning unit, the binning unit to communicate a plurality of tiled 3D primitive rendering operations corresponding to the 3D primitive to the 3D pipeline, the 3D pipeline to perform the plurality of tiled 3D primitive rendering operations.

10. The system of claim 9, further comprising a graphics cache memory to store intermediate 3D rendering and 2D blit results, the graphics cache memory coupled to the 2D pipeline and further coupled to the 3D pipeline.

11. The system of claim 10, wherein the graphics cache memory shares the same die with a microprocessor cache memory.

12. A system, comprising:
a microprocessor to sort a 3D primitive and a 2D blit operation into a plurality of bins;
a system memory to store copies of data representing the sorted 3D primitive and the sorted 2D blit operation; and
a system logic unit coupled between the microprocessor and the system memory, the system logic unit including
a memory controller to provide access to the system memory, and
a graphics controller including a 2D pipeline, the graphics controller to communicate a plurality of tiled blit operations corresponding to the 2D blit operation to the 2D pipeline, the 2D pipeline to perform the plurality of tiled blit operations.

13. The system of claim 12, wherein the graphics controller further includes a 3D pipeline, the microprocessor to communicate a plurality of tiled 3D primitive rendering operations corresponding to the 3D primitive to the 3D pipeline, the 3D pipeline to perform the plurality of tiled 3D primitive rendering operations.

14. The system of claim 13, further comprising a graphics cache memory to store intermediate 3D rendering and 2D blit results, the graphics cache memory coupled to the 2D pipeline and further coupled to the 3D pipeline.

15. The system of claim 14, wherein the graphics cache memory shares the same die with a microprocessor cache memory.

16. A method, comprising:
sorting a first 3D primitive into at least one of a plurality of bins;
sorting a 2D blit operation into at least one of the plurality of bins;
sorting a second 3D primitive into at least one of the plurality of bins; and
rendering the plurality of bins.

17. A method, comprising:
sorting a first 3D primitive into at least one of a plurality of bins, a portion of the first 3D primitive intersecting a first tile;
sorting a 2D blit operation into at least one of the plurality of bins, a portion of the 2D blit operation intersecting the first tile;
sorting a second 3D primitive into at least one of the plurality of bins, a portion of the second 3D primitive intersecting the first tile; and
rendering data stored in a first bin storage area, the first bin corresponding to the first tile.

18. The method of claim 17, wherein rendering the data stored in a first storage area includes determining which portions of the first and second 3D primitives and which portion of the 2D blit operation fit within the first tile.

19. The method of claim 18, wherein rendering the data stored in a first storage area further includes rendering the portion of the first 3D primitive that fits within the first tile;
performing the portion of the 2D blit operation that fits within the first tile; and
rendering the portion of the second 3D primitive that fits within the first tile.

20. A machine-readable medium having stored thereon instructions which, when executed by a computer system, causes the computer system to perform a method including:
sorting a 3D primitive into at least one of a plurality of bins;
sorting a 2D blit operation into at least one of the plurality of bins; and
instructing a graphics controller to render the plurality of bins.

* * * * *